June 28, 1955  K. L. HERRMANN  2,711,938
ANTI-FRICTION BEARING HAVING IRREGULARLY SPACED ROLLERS
Filed Dec. 6, 1951
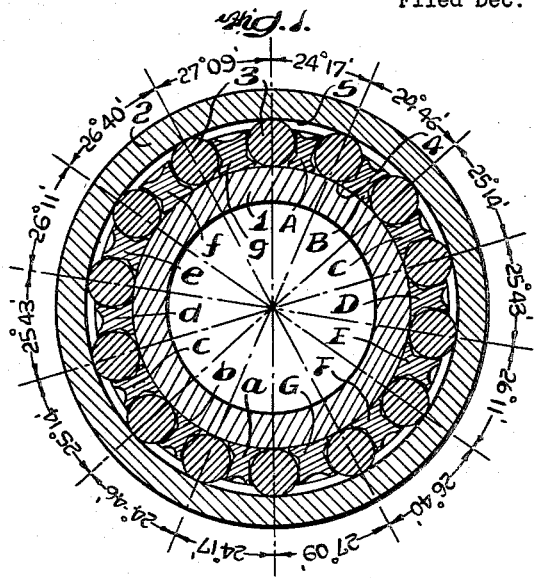
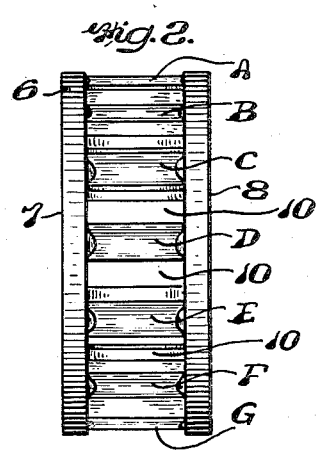
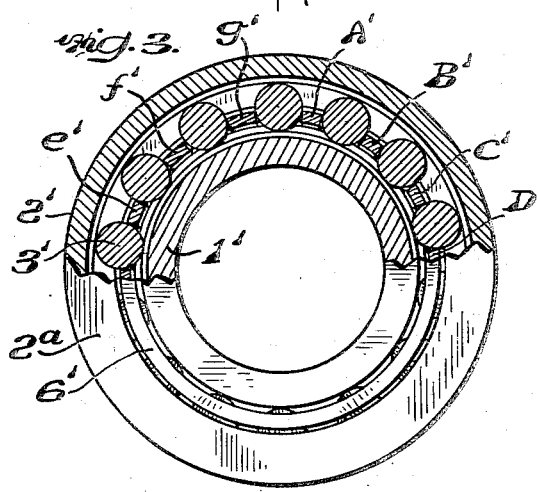
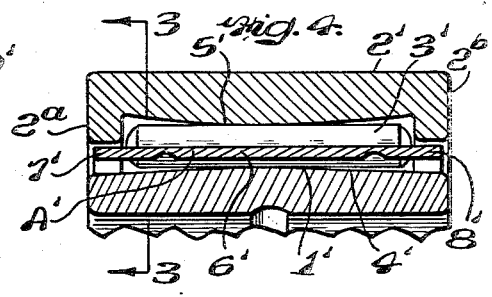
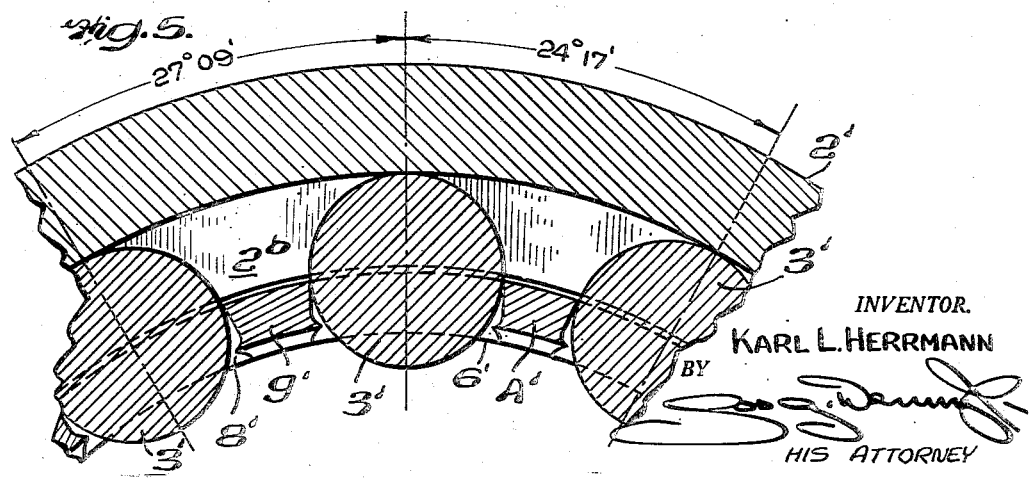
INVENTOR.
KARL L. HERRMANN
BY
HIS ATTORNEY

United States Patent Office 2,711,938
Patented June 28, 1955

2,711,938

ANTI-FRICTION BEARING HAVING IRREGULARLY SPACED ROLLERS

Karl L. Herrmann, Glendale, Calif., assignor to Roller Bearing Company of America, Trenton, N. J., a corporation of New Jersey Application December 6, 1951, Serial No. 260,278

6 Claims. (Cl. 308—217)

My invention is a roller bearing comprising a series of rotatable rollers moveable in an orbit and so positioned that the orbital distances between rollers of the series differ substantially from one another to facilitate overlapping of raceway areas contacted by adjacent rollers upon to and fro movements of the roller series or of one or both raceways relative thereto.

My improvements eliminate or minimize brinelling or the formation of recesses and ridges in the raceways and side ribs of bearings under heavy load, bring the rollers into the load zone at irregular rates, and minimize tendency to resonance in high speed bearings.

Preferably the rollers are so arranged that the rollers of each dimetral pair are equally spaced from one another, but that the rollers on opposite sides of any roller are differently spaced therefrom. The rollers may be conveniently arranged in similar but opposite semi-circular sets, with each of the successive rollers of each set spaced from the preceding roller by increasing (or decreasing) but irregular increments.

The positioning of the rollers relatively to one another is preferably effected by a guiding cage having roller windows of uniform circumferential width spaced from one another by guiding cross bars whose circumferential widths differ from one another at least in their roller guiding zone which is preferably coincident with the pitch circle of the axes of rotation of the rollers. The rollers are preferably retained in the windows by lips or retainers, some of which are sufficiently flexible for bending into roller retaining position after the assembly of the rollers in the windows.

The principles of my invention, and the best forms in which I have contemplated applying such principles, will more fully appear from the following description and the accompanying drawings in illustration thereof.

In the drawings, Fig. 1 is a transverse sectional view through a cylindrical roller bearing embodying my invention and having the rollers irregularly spaced from one another by a cast cage; Fig. 2 is a peripheral elevation of the cage of the bearing shown in Fig. 1; Fig. 3 is a part sectional, end elevation of a cylindrical roller bearing embodying my invention and having the rollers irregularly spaced by a tubular sheet metal cage riding on side ribs of a race ring; the section being taken approximately on the line 3—3 of Fig. 4; Fig. 4 is an axial sectional view through a part of the bearing shown on Fig. 3, and Fig. 5 is a greatly enlarged fragmentary sectional view of a part of the bearing shown in Figs. 3 and 4 with the inner race ring omitted.

In the form illustrated in Figs. 1 and 2, my invention is embodied in an anti-friction bearing comprising an inner, cylidrical race ring 1, an outer cylindrical race ring 2, a series of irregularly spaced, rotatable cylindrical rollers 3, of uniform diameter and movable in a circular orbit between the raceways 4 and 5 of the rings 1 and 2, and a cylindrical cage 6, preferably cast of nonferrous metal, such as bronze.

The cage 6 comprises a pair of symmetrical, cylindrical rims 7 and 8 connected with one another by sets of intergral cross bars A, B, C, D, E, F, G, $a$, $b$, $c$, $d$, $e$, $f$, $g$. The bearing radii intersecting the radial centers of the cross bars are uniformly spaced around the bearing axis and the bars are uniformly spaced from one another to form roller windows 10 of uniform circumferential widths. But the circumferential width of each cross bar of the set A—G, differs from the width of every other cross bar of that set, and the circumferential width of each cross bar of the set $a$—$g$ differs from the width of every other cross bar of that set. Diametral cross bars e. g., A$a$, G$g$ are of the same circumferential widths.

Since the bars A to G are progressively thicker, the angular distances between the axes of the rollers on opposite sides of each such bar are progressively greater, and since the bars $a$ to $g$ are progressively thicker, the angular distances between the axes of the rollers on opposite sides of each such bar are progressively greater, and the distances between the axes of diametral pairs of rollers are substantially the same as one another.

The progressive increase in the angular distances in each half of the orbit may be at an irregular rate. In the example shown by way of illustration, the angular distance between the bearing radii passing through the axes of the respective pairs of rollers on opposite sides of each of the bars A and $a$ is 24° 17′; the angular distance between the bearing radii passing through the axes of the respective pairs of rollers on opposite sides of each of the bars B and $b$ is 24° 46′ or 29′ greater than the previous angular distance; the angular distance between the bearing radii passing through the axes of the respective pairs of rollers on opposite sides of each of the bars C and $c$ is 25° 14′ or 68′ greater than the previous angular distance; the angular distance between the bearing radii passing through the axes of the respective pairs of rollers on opposite sides of each of the bars D and $d$ is 25° 43′ or 29′ greater than the previous angular distance; the angular distance between the bearing radii passing through the axes of the respective pairs of rollers on opposite sides of each of the bars E and $e$ is 26° 11′ or 68′ greater than the previous angular distance; the angular distance between the bearing radii passing through the axes of the respective pairs of rollers on opposite sides of each of the bars F and $f$ is 26° 40′ or 29′ greater than the previous angular distance; the angular distance between the bearing radii passing through the axes of the respective pairs of rollers on opposite sides of each of the bars G and $g$ is 27° 09′ or 69′ greater than the previous angular distance.

The bearing is preferably designed so that the angular distance between two sequential rollers is less than the normal angular oscillatory movement between the race rings or between the race ring and cage, so that the entire area of both races is rolled at each stroke; tendency to form transverse grooves in races is obviated or minimized; resonance and vibration are obviated or minimized; and the rollers enter the load zone of the bearing at irregular intervals, with consequent tendency to increase the movement of the cage and rollers in the orbit and thus further equalize action of the rollers on the raceways.

The complementary faces of the adjacent cross bars are preferably substantially parallel with one another at their points of line contact with the roller peripheries and the rollers may be held in the windows by flaring lips on the bars, some of which may be flared over the rollers by a suitable tool after the rollers have been seated in the windows.

The inner surfaces of the rims 7 and 8 make a loose slip fit with the surface of the raceway 4 so that the cage does not rest upon the rollers, but acts to guide the rollers in a true path around the axis of the bearing.

My invention is of particular advantage when the cage with irregularly spaced rollers therein is telescoped on a shaft and in a housing without the interposition of hardened race rings.

In Figs. 3, 4 and 5 I have illustrated the embodiment of my invention in a roller bearing comprising a cylindrical inner race ring 1'; an outer race ring 2' provided with integral side ribs 2 and 2b; a series of cylindrical rollers 3' rotatable in an orbit between the cylindrical raceway 4' and the axially convexed raceway 5' of the race rings 1' and 2' respectively, and a cage 6' which preferably consists of a tubular shell of sheet steel. The cage 6' comprises a pair of cylindrical rims 7' and 8' connected together by sets of integral cross bars A', B', C', D' . . . e', f', g'. The bars of each set differ from one another in circumferential widths at the points of roller contact therewith and are so spaced from one another as to form between them windows of uniform circumferential widths for receiving the cylindrical rollers 3'. The irregular circumferential widths of the cross bars are similar to the arrangement shown in Figs. 1 and 2 and results in spacing the rollers 3' similarly to the spacing of the rollers 3.

The spaced symmetrical side ribs 2a and 2b border the raceway 5' adjacent to the curved ends of the rollers 3' and make a slip fit with the rims 7' and 8' along a line of juncture substantially coincident with the pitch circle of the axes of the rollers 3'.

The bars A', B', C', etc. e', f', g' contact and guide peripheries of the rollers 3' adjacent to the pitch circle and position the rollers circumferentially so that the angles between bearing radii intersecting axes of rollers on opposite sides of successive bars differ from one another. Consequently, the surfaces of the raceways and the surfaces of the side ribs 2a and 2b traversed by the respective rollers, upon reciprocatory movement of one or both races relatively to the cage, overlap one another and the formation of transverse grooves in the surfaces of the raceways or the formation of spaced depressions in the radial surfaces of the side ribs engaged by the rounded ends of the rollers is prevented or minimized.

Having described my invention I claim:

1. A roller bearing comprising cylindrical members forming concentric raceways, a series of rotatable rollers movable along said raceways in a circular orbit and means causing the surfaces of said raceways traversed by the respective rollers to overlap one another upon to-and-fro movements of one or both raceways, said means including bars positioning sequential rollers in half the circumference of the bearing at irregular distances from one another, and bars positioning sequential rollers in the remainder of the circumference of the bearing at irregular distances from one another and contra to the positioning of the rollers in the first named half of the circumference.

2. A roller bearing comprising a series of rotatable rollers movable in a circular orbit, and means for positioning said rollers so that the rollers of substantially diametral pairs are equally spaced from one another and the rollers on opposite sides of each pair are spaced unequally from the roller of such pair adjacent thereto.

3. A roller bearing comprising a series of rotatable rollers sequentially movable in a cylindrical orbit with their axes unequally spaced from one another and forming similar but opposite semicircular sets, each of the successive rollers of each set being spaced from the preceding roller by irregular increments, and race-ways engaging said rollers, one of said race-ways having ribs at the sides thereof in position for engagement by ends of said rollers.

4. A roller bearing comprising a cage containing windows spaced by cross bars and rollers in said windows and spaced by said bars so that the distance between roller axes of rollers on opposite sides of each bar differs from the distance between roller axes of rollers on opposite sides of an adjacent bar, said bars positioning said rollers in similar but opposite semicircular sets.

5. A roller bearing comprising a cage containing windows spaced by cross bars and rollers in said windows and spaced by said bars, the bars disposed in half the circumference of the cage each being of different width from an adjoining bar and the bars in the other half of the circumference of the cage each being of a different width from an adjoining bar and the aggregate widths of all the bars in the first half of such circumference being substantially the same as the aggregate widths of all the bars in the second half of such circumference.

6. A roller bearing comprising cylindrical members forming concentric raceways, rollers between said raceways, and a cage positioning said rollers in similar but opposite semicircular sets, said cage having roller windows of uniform circumferential width and cross bars spacing said windows, said cross bars being arranged in diametral pairs of uniform circumferential width in their roller guiding zones coincident with the pitch circle of the axes of rotation of the rollers, and each diametral pair of bars differing in such circumferential width from each of the other diametral pair of bars.

References Cited in the file of this patent

UNITED STATES PATENTS

| 238,579 | Ellis | Mar. 8, 1881 |
| 1,439,402 | Buckwalter | Dec. 19, 1922 |
| 2,391,245 | Kail | Dec. 18, 1945 |

FOREIGN PATENTS

| 852,128 | France | Jan. 24, 1940 |